(12) United States Patent
Sugiyama et al.

(10) Patent No.: US 10,263,472 B2
(45) Date of Patent: Apr. 16, 2019

(54) CONTACTLESS POWER TRANSFER SYSTEM AND POWER TRANSMISSION DEVICE

(71) Applicant: TOYOTA JIDOSHA KABUSHIKI KAISHA, Toyota-shi, Aichi-ken (JP)

(72) Inventors: Yoshinobu Sugiyama, Toyota (JP); Toshihiko Minamii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 15/239,610

(22) Filed: Aug. 17, 2016

(65) Prior Publication Data

US 2017/0063161 A1    Mar. 2, 2017

(30) Foreign Application Priority Data

Aug. 28, 2015   (JP) ................................ 2015-168901

(51) Int. Cl.
| | |
|---|---|
| *H02J 50/12* | (2016.01) |
| *H02J 7/02* | (2016.01) |
| *B60L 11/18* | (2006.01) |
| *H02H 3/20* | (2006.01) |
| *H02H 3/02* | (2006.01) |
| *H02J 50/80* | (2016.01) |

(52) U.S. Cl.
CPC ............. *H02J 50/12* (2016.02); *B60L 11/182* (2013.01); *H02H 3/023* (2013.01); *H02H 3/20* (2013.01); *H02J 7/025* (2013.01); *H02J 50/80* (2016.02)

(58) Field of Classification Search
CPC ......... H02J 50/12; H02J 7/025; B60L 11/182; H02H 3/20; H02H 3/023
See application file for complete search history.

(56) References Cited

U.S. PATENT DOCUMENTS

| | | | |
|---|---|---|---|
| 7,741,734 B2 | 6/2010 | Joannopoulos et al. | |
| 9,866,073 B2 * | 1/2018 | Joye | ..................... H04B 5/0037 |
| 2007/0207747 A1 * | 9/2007 | Johnson | ................... H04B 1/52 455/78 |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Alfonso Perez Borroto
*Assistant Examiner* — Esayas G Yeshaw
(74) *Attorney, Agent, or Firm* — Oliff PLC

(57) ABSTRACT

A contactless power transfer system includes a power supply ECU configured to control an inverter to stop power transmission from a power transmission unit when a current generated in the power transmission unit exceeds a predetermined threshold value due to short-circuiting of a power reception coil. The power supply ECU estimates a coupling state between a power transmission coil and the power reception coil, and changes the predetermined threshold value in accordance with the estimated coupling state.

5 Claims, 8 Drawing Sheets

(56) References Cited

U.S. PATENT DOCUMENTS

| | | |
|---|---|---|
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0007437 A1* | 1/2012 | Fells ............... H01F 38/14 307/104 |
| 2013/0127409 A1 | 5/2013 | Ichikawa |
| 2013/0193749 A1 | 8/2013 | Nakamura et al. |
| 2013/0293028 A1* | 11/2013 | Byun ............... H01F 38/14 307/104 |
| 2013/0293189 A1* | 11/2013 | Low ............... H01F 38/14 320/108 |
| 2013/0342161 A1* | 12/2013 | Byun ............... H02J 5/005 320/108 |
| 2014/0375257 A1* | 12/2014 | Akiyama ............... H02J 5/005 320/108 |
| 2015/0008877 A1 | 1/2015 | Ichikawa et al. |
| 2015/0180286 A1* | 6/2015 | Asanuma ............... G01B 7/003 307/104 |
| 2015/0236537 A1* | 8/2015 | Luo ............... H02J 7/0029 320/108 |
| 2015/0274023 A1 | 10/2015 | Houivet et al. |
| 2015/0326028 A1* | 11/2015 | Suzuki ............... H02J 17/00 307/104 |
| 2016/0025821 A1* | 1/2016 | Widmer ............... G01R 33/0047 324/258 |
| 2017/0179772 A1* | 6/2017 | Asanuma ............... H02J 17/00 |

FOREIGN PATENT DOCUMENTS

| | | |
|---|---|---|
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 104661851 A | 5/2015 |
| EP | 1 902 505 A2 | 3/2008 |
| EP | 2 130 287 A1 | 12/2009 |
| FR | 2996372 A1 | 4/2014 |
| IN | 735/DELNP/2008 | 5/2008 |
| IN | 6195/DELNP/2009 | 7/2010 |
| JP | 2003-209903 A | 7/2003 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-223258 A | 10/2013 |
| JP | 2016-111819 A | 6/2016 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2014/053742 A1 | 4/2014 |

* cited by examiner

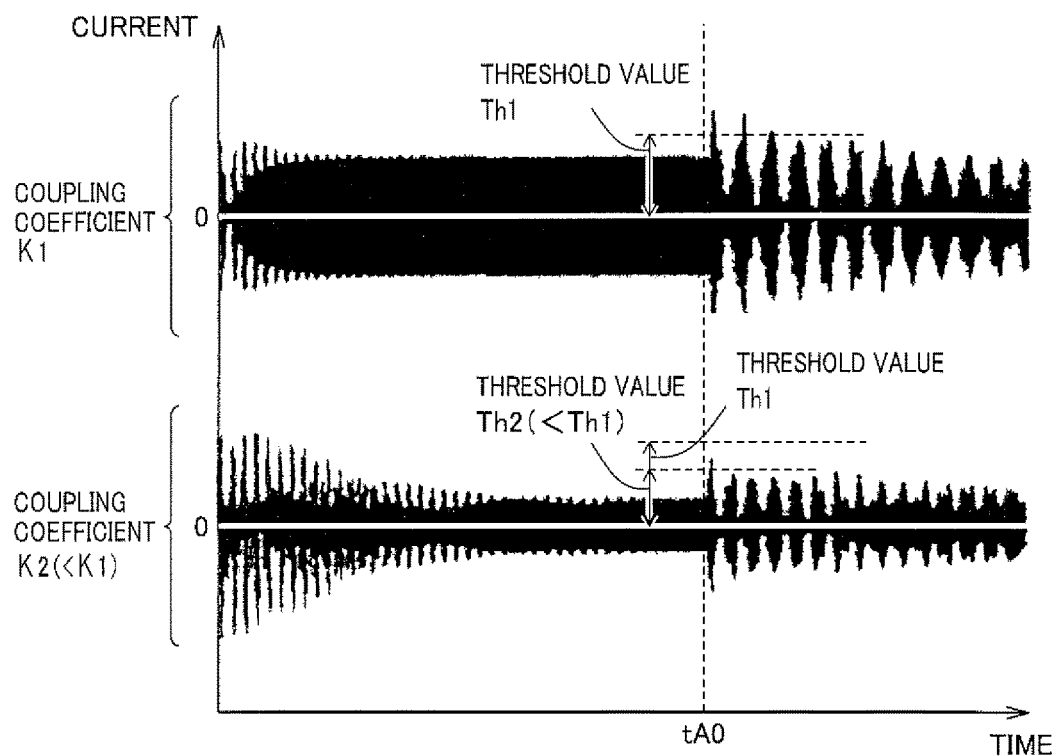

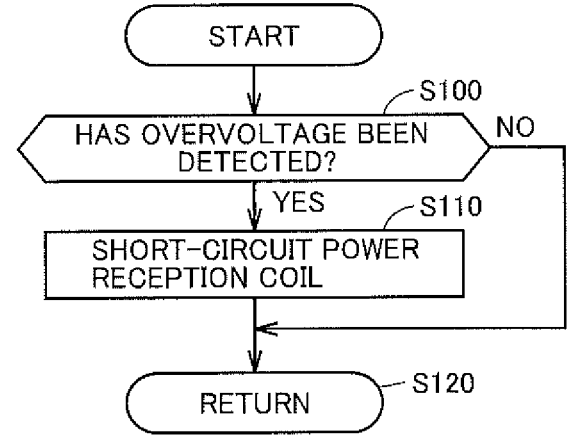
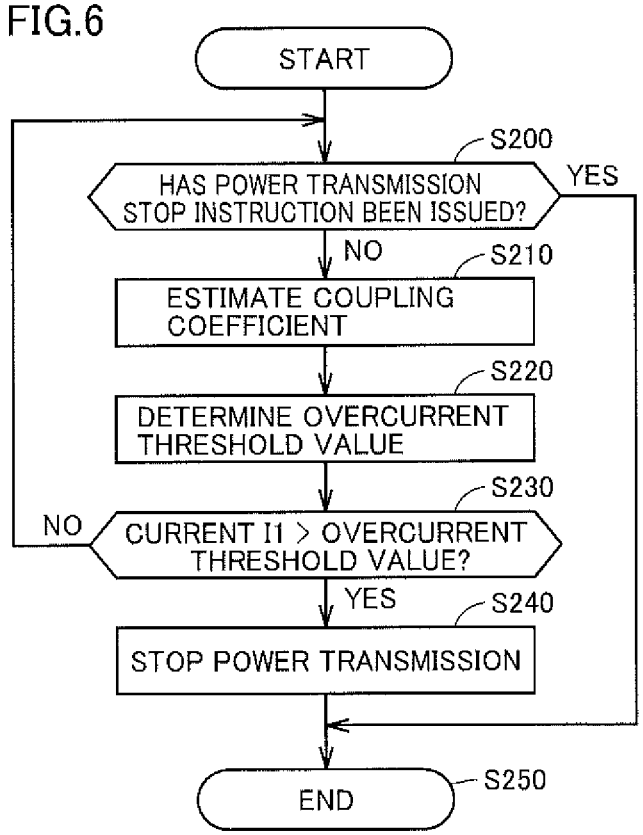

FIG.9

| COUPLING COEFFICIENT | OVERCURRENT THRESHOLD VALUE |
|---|---|
| KA1 | ThA1 |
| KA2(<KA1) | ThA2(>ThA1) |
| ⋮ | ⋮ |

400A

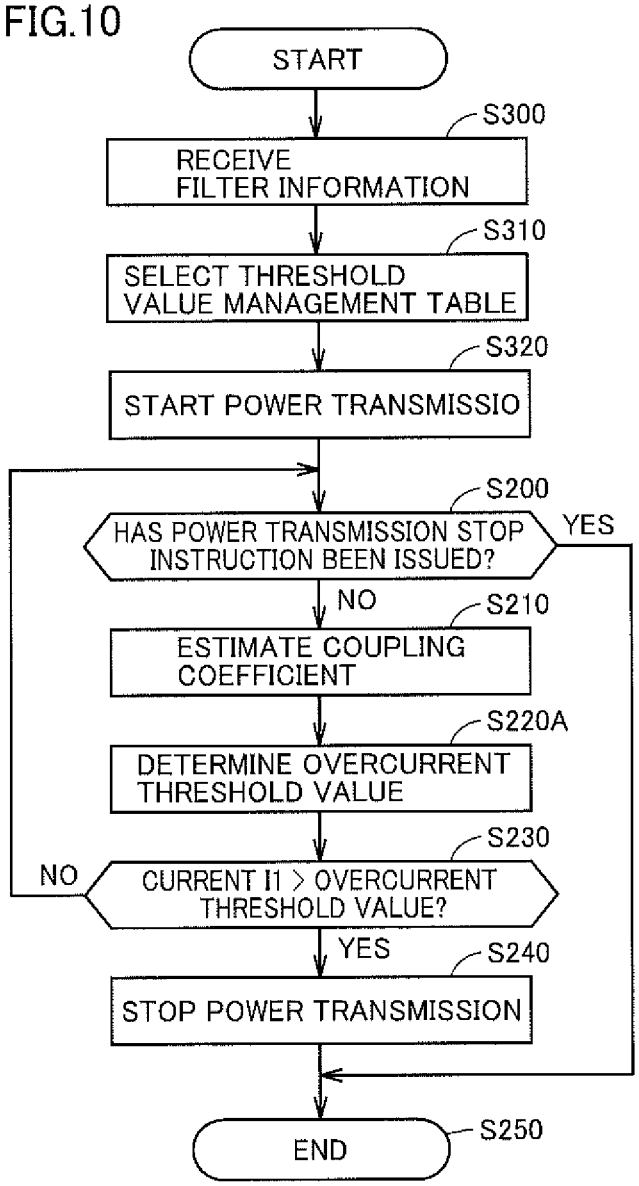

CONTACTLESS POWER TRANSFER SYSTEM AND POWER TRANSMISSION DEVICE

This nonprovisional application is based on Japanese Patent Application No. 2015-168901 filed on Aug. 28, 2015, with the Japan Patent Office, the entire contents of which are hereby incorporated by reference.

BACKGROUND OF THE INVENTION

Field of the Invention

The present invention relates to a contactless power transfer system and a power transmission device, and particularly to a technique for protecting, when an abnormality occurs, a contactless power transfer system that transfers electric power in a contactless manner between a power transmission device and a power reception device.

Description of the Background Art

Conventionally, contactless power transfer systems transmitting electric power from a power transmission device to a power reception device in a contactless manner are known (see Japanese Patent Laying-Open Nos. 2013-154815, 2013-146154, 2013-146148, 2013-110822, 2013-126327, and 2003-209903). The power transmission device includes a power transmission coil, and the power reception device includes a power reception coil.

For example, in a contactless power feeding system disclosed in Japanese Patent Laying-Open No. 2003-209903, a contactless power feeding device (power reception device) includes a resonant circuit unit, a power reception unit, and an output voltage restriction unit. The resonant circuit unit receives electric power in a contactless manner from an AC power supply. The power reception unit outputs electric power supplied from the resonant circuit unit to a motor. When an output voltage of the power reception unit becomes more than or equal to a reference voltage, the output voltage restriction unit causes electric power from the resonant circuit unit to be supplied to a shunt rather than a main path along which electric power is supplied from the resonant circuit unit to the power reception unit. Accordingly, electric power supply from the resonant circuit unit to the power reception unit is interrupted, and the output voltage of the power reception unit decreases. As a result, with this technique, an excess of the output voltage of the power reception unit can be avoided, and damage to devices can be prevented.

SUMMARY OF THE INVENTION

When an abnormality originating from power transfer occurs during power transfer in a contactless power transfer system that performs power transfer in a contactless manner between a power transmission device and a power reception device, it is desirable that power transfer be stopped immediately from a viewpoint of system protection. An exemplary abnormality originating from power transfer is an overvoltage generated in a power reception device.

For preventing an overvoltage, the power reception device can be configured to short-circuit the power reception coil when an overvoltage occurs. In such a case, the impedance on the power reception device side as seen from the power transmission coil side decreases by short-circuiting the power reception coil when an overvoltage occurs in the power reception device, with the result that a current generated in the power transmission device increases. By detecting that the current generated in the power transmission device has increased beyond a predetermined value, it can be detected indirectly that an overvoltage has occurred in the power reception device, and by taking appropriate protection measures accordingly, the devices can be protected.

In the contactless power transfer system, however, the current generated in the power transmission device when the power reception coil is short-circuited may vary in magnitude depending on the coupling state between the power transmission coil and the power reception coil. Therefore, even if the current generated in the power transmission device becomes more than or equal to a certain threshold value, an overvoltage has not necessarily occurred in the power reception device depending on the magnitude of a coupling coefficient. Thus, a case may occur in which power transfer cannot be stopped in an appropriate situation with the method of comparing the current generated in the power transmission device with a certain threshold value. Such a problem and a solution therefor are not particularly discussed in Japanese Patent Laying-Open Nos. 2013-154815, 2013-146154, 2013-146148, 2013-110822, 2013-126327, and 2003-209903 mentioned above.

The present invention was made to solve such a problem, and has an object to provide a contactless power transfer system that can stop power transfer immediately to protect devices when an abnormality originating from power transfer occurs during contactless power transfer.

A contactless power transfer system according to an aspect of the present invention is a contactless power transfer system for transferring electric power in a contactless manner between a power transmission device and a power reception device. The contactless power transfer system includes a power transmission unit, a power reception unit, a protection circuit, and a control unit. The power transmission unit includes a power transmission coil and transmits electric power in a contactless manner. The power reception unit includes a power reception coil and receives electric power from the power transmission unit in a contactless manner. The protection circuit short-circuits the power reception coil when an overvoltage occurs in the power reception device originating from power reception by the power reception unit. The control unit is configured to control the power transmission unit to stop power transmission when a current generated in the power transmission unit exceeds a predetermined threshold value due to short-circuiting of the power reception coil. The control unit is configured to estimate a coupling state between the power transmission coil and the power reception coil, and change the predetermined threshold value in accordance with the estimated coupling state.

A power transmission device according to another aspect of the present invention is a power transmission device for transmitting electric power to a power reception device in a contactless manner. The power reception device includes a power reception unit and a protection circuit. The power reception unit includes a power reception coil and receives electric power in a contactless manner. The protection circuit short-circuits the power reception coil when an overvoltage occurs in the power reception device originating from power reception by the power reception unit. The power transmission device includes a power transmission unit and a control unit. The power transmission unit includes a power transmission coil and transmits electric power to the power reception unit in a contactless manner. The control unit is configured to control the power transmission unit to stop power transmission when a current generated in the power transmission unit exceeds a predetermined threshold value due to short-circuiting of the power reception coil. The control unit is configured to estimate a coupling state between the power transmission coil and the power reception coil, and change the predetermined threshold value in accordance with the estimated coupling state.

In these contactless power transfer system and power transmission device, the threshold value to be compared with the current generated in the power transmission unit for determining whether to stop power transmission is changed in accordance with the coupling state between the power transmission coil and the power reception coil. Therefore, according to this contactless power transfer system, an increase in current in the power transmission unit following short-circuiting of the power reception coil can be detected appropriately even if the coupling state between the power transmission coil and the power reception coil varies. Accordingly, when an abnormality such as an overvoltage occurs, power transmission can be stopped in an appropriate situation to protect the devices.

Preferably, the contactless power transfer system further includes filters connected to the power transmission unit and the power reception unit, respectively. The predetermined threshold value is set previously in accordance with properties of the filters.

The relation between the strength of the coupling state between the power transmission coil and the power reception coil and the magnitude of the current in the power transmission unit following short-circuiting of the power reception coil varies with properties of the filters connected to the power transmission unit and the power reception unit, respectively. In this contactless power transfer system, the threshold value for the current value is set in accordance with the properties of the filters. Therefore, according to this contactless power transfer system, even if the filters connected to the power transmission unit and the power reception unit are of different types, power transmission can be stopped in an appropriate situation when an abnormality such as an overvoltage occurs, thereby protecting the devices.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows differences in detection value of a current sensor in accordance with the magnitude of a coupling coefficient between a power transmission coil and a power reception coil.

FIG. 4 shows a table which manages coupling coefficients and overcurrent threshold values in association.

FIG. 5 is a flowchart showing an operation executed by a drive circuit when an overvoltage occurs.

FIG. 6 is a flowchart showing an operation of a power transmission device originating from the occurrence of an overvoltage in a power reception device.

FIG. 9 shows an example of a threshold value management table which manages an overcurrent threshold value for each coupling coefficient.

FIG. 10 is a flowchart showing an operation of a power transmission device originating from the occurrence of an overvoltage in a power reception device according to a third embodiment.

DESCRIPTION OF THE PREFERRED EMBODIMENTS

Figure 1:
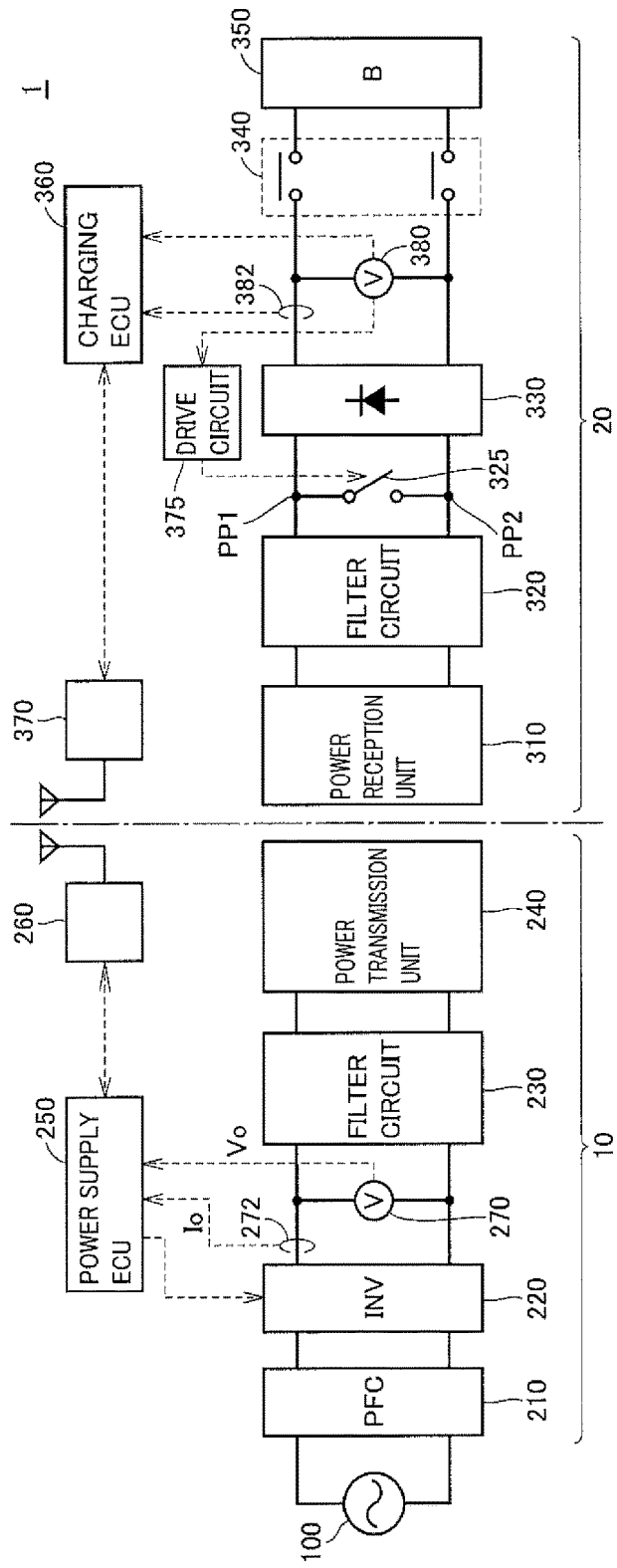
FIG. 1 shows an overall configuration of a power transfer system according to a first embodiment.

Hereinafter, embodiments of the present invention will be described in detail with reference to the drawings. A plurality of embodiments will be shown below. It is intended as of filing to combine features described in the respective embodiments as appropriate. In the drawings, the same or corresponding portions have the same reference characters allotted, and description thereof will not be repeated.

(First Embodiment)
<Configuration of Contactless Power Transfer System>
FIG. 1 shows an overall configuration of a contactless power transfer system according to an embodiment of the present invention. Referring to FIG. 1, this contactless power transfer system 1 includes a power transmission device 10 and a power reception device 20. Power reception device 20 may be mounted on a vehicle or the like that can travel using electric power transmitted in a contactless manner from power transmission device 10, for example.

Power transmission device 10 includes a power factor correction (PFC) circuit 210, an inverter 220, a filter circuit 230, and a power transmission unit 240. Power transmission device 10 further includes a power supply ECU (Electronic Control Unit) 250, a communication unit 260, a voltage sensor 270, and a current sensor 272.

PFC circuit 210 can rectify and boost AC power received from an AC power supply 100 (e.g., system power supply) for supply to inverter 220 and can bring an input current close to a sine wave, thereby correcting the power factor. Any of publicly known various PFC circuits can be adopted as this PFC circuit 210. Instead of PFC circuit 210, a rectifier without the power factor correcting function may be adopted.

Inverter 220 converts DC power received from PFC circuit 210 into transmission power (AC) having a predetermined transmission frequency. The transmission power produced by inverter 220 is supplied to power transmission unit 240 through filter circuit 230. Inverter 220 is implemented by a single-phase full bridge circuit, for example.

Filter circuit 230 is provided between inverter 220 and power transmission unit 240, and suppresses a harmonic noise caused by inverter 220. Filter circuit 230 is implemented by an LC filter including one each of an inductor and a capacitor. However, filter circuit 230 is not necessarily limited to such a configuration. Filter circuit 230 may be implemented by an LC filter including a plurality of inductors and a plurality of capacitors, or may be implemented by either an inductor or a capacitor.

Power transmission unit 240 receives AC power (transmission power) having a transmission frequency from inverter 220 through filter circuit 230, and transmits the electric power in a contactless manner to a power reception unit 310 of power reception device 20 through an electromagnetic field produced around power transmission unit 240. Power transmission unit 240 includes a resonant circuit for transmitting electric power to power reception unit 310 in a contactless manner. The resonant circuit is configured to include a coil and a capacitor. However, the resonant circuit is not necessarily limited to such a configuration. The capacitor may be omitted when a desired resonant state is achieved only with the capacitive component of the coil.

Voltage sensor 270 detects an output voltage of inverter 220, and outputs a detected value to power supply ECU 250. Current sensor 272 detects an output current of inverter 220, and outputs a detected value to power supply ECU 250. The detection value of current sensor 272 can be regarded as an input current value of power transmission unit 240. Based on the detected values of voltage sensor 270 and current sensor 272, transmission power supplied from inverter 220 to power transmission unit 240 may be detected.

Power supply ECU 250, including a CPU (Central Processing Unit), a memory device, an input/output buffer, and the like (neither shown), receives signals from various sensors and devices, and controls various devices in power transmission device 10. As an example, power supply ECU 250 exerts switching control of inverter 220 such that inverter 220 produces transmission power (AC) when power transmission from power transmission device 10 to power reception device 20 is executed. Various types of controls are not limited to processing by software, but may be processed by dedicated hardware (an electronic circuit).

For example, power supply ECU 250 determines whether or not the detection value of current sensor 272 exceeds an overcurrent threshold value. Here, the overcurrent threshold value is a threshold value for determining whether or not an overcurrent has occurred in power transmission device 10. When it is determined that the detection value of current sensor 272 exceeds the overcurrent threshold value, power supply ECU 250 controls inverter 220 to stop power transmission from power transmission unit 240. Moreover, power supply ECU 250 estimates a coupling coefficient between power transmission coil 242 (FIG. 2) included in power transmission unit 240 and power reception coil 312 (FIG. 2) included in power reception unit 310. Power supply ECU 250 then changes the overcurrent threshold value in accordance with the estimated coupling coefficient. A specific method of estimating the coupling coefficient and the significance of changing the overcurrent threshold value in accordance with the coupling coefficient will be described later in detail.

Figure 2:
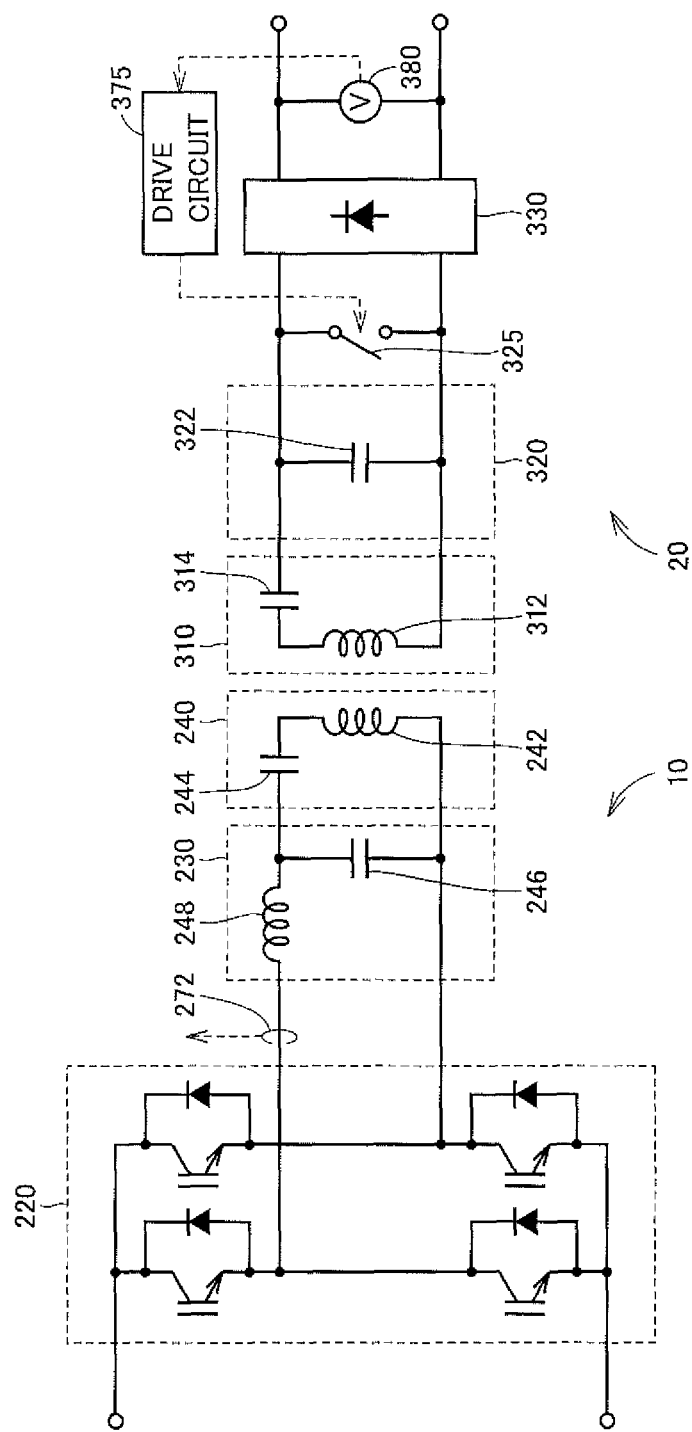
FIG. 2 shows the details of a configuration relevant to power transmission and reception.

Communication unit 260 is configured to make wireless communications with a communication unit 370 of power reception device 20. For example, communication unit 260 receives, from communication unit 370, information (a voltage of power received by power reception device 20, etc.) necessary for estimating the coupling coefficient between power transmission coil 242 (FIG. 2) and power reception coil 312 (FIG. 2).

On the other hand, power reception device 20 includes power reception unit 310, a filter circuit 320, a rectification unit 330, a relay circuit 340, and a power storage device 350. Power reception device 20 further includes a charging ECU 360, communication unit 370, a voltage sensor 380, and a current sensor 382.

Power reception unit 310 receives in a contactless manner electric power (AC) output from power transmission unit 240 of power transmission device 10. Power reception unit 310 includes a resonant circuit for receiving electric power from power transmission unit 240 in a contactless manner, for example. The resonant circuit is composed of a coil and a capacitor. However, the resonant circuit is not necessarily limited to such a configuration. For example, the capacitor may be omitted when a desired resonant state is achieved only with the capacitive component of the coil, for example. Power reception unit 310 outputs received power to rectification unit 330 through filter circuit 320.

Filter circuit 320 is provided between power reception unit 310 and rectification unit 330, and suppresses a harmonic noise produced at the time of power reception. Filter circuit 320 is implemented by a C filter including a capacitor. However, filter circuit 320 is not necessarily limited to such a configuration. Filter circuit 320 may be implemented by an LC filter including an inductor and a capacitor, for example. Rectification unit 330 rectifies AC power received by power reception unit 310 for output to power storage device 350. The details of power reception unit 310 and filter circuit 320 will be described later.

Power storage device 350 is a rechargeable DC power supply, and is implemented by a secondary battery, such as a lithium-ion battery or a nickel-metal hydride battery, for example. Power storage device 350 stores electric power output from rectification unit 330. Power storage device 350 then supplies the stored electric power to a load driving device or the like not shown.

Relay circuit 340 is provided between rectification unit 330 and power storage device 350, and is closed when power storage device 350 is charged by power transmission device 10. Although not particularly shown, a DC/DC converter that adjusts an output voltage of rectification unit 330 may be provided between rectification unit 330 and power storage device 350 (e.g., between rectification unit 330 and relay circuit 340).

Voltage sensor 380 detects an output voltage (a voltage of received power) of rectification unit 330, and outputs the detected value to charging ECU 360. Current sensor 382 detects an output current (a current of received power) from rectification unit 330, and outputs the detected value to charging ECU 360. Based on the detected values of voltage sensor 380 and current sensor 382, electric power received by power reception unit 310 (i.e., charging power for power storage device 350) can be detected. A crowbar circuit 325 is provided between filter circuit 320 and rectification unit 330. Crowbar circuit 325 is controlled by a signal from drive circuit 375 to switch the electric connection state of a connection node PP1 and a connection node PP2. By bringing crowbar circuit 325 into an electrically conductive state, connection nodes PP1 and PP2 are short-circuited, so that power reception coil 312 (FIG. 2) is short-circuited. Crowbar circuit 325 is implemented by a relay, for example.

Drive circuit 375 switches the state of crowbar circuit 325 between the conductive state and the interrupted state. Drive circuit 375 monitors the detection value of voltage sensor 380, and when the detection value of voltage sensor 380 exceeds a predetermined voltage, brings crowbar circuit 325 into the conductive state. Accordingly, power reception coil 312 is short-circuited (FIG. 2). Drive circuit 375 is implemented by a comparator, for example.

Charging ECU 360, including a CPU, a memory device, an input/output buffer, and the like (neither shown), receives signals from various sensors and devices, and controls various devices in power reception device 20. Various types of controls are not limited to processing by software, but may be processed by dedicated hardware (an electronic circuit).

Communication unit 370 is configured to make wireless communications with communication unit 260 of power transmission device 10. For example, communication unit 370 transmits, to communication unit 260, information (a voltage of power received by power reception device 20, etc.) necessary for estimating the coupling coefficient between power transmission coil 242 (FIG. 2) and power reception coil 312 (FIG. 2).

In this contactless power transfer system 1, transmission power (AC) is supplied from inverter 220 to power transmission unit 240 through filter circuit 230. Power transmission unit 240 and power reception unit 310 each include a coil and a capacitor, and are designed to resonate at a transmission frequency. The Q factor indicating the resonance strength of power transmission unit 240 and power reception unit 310 is preferably more than or equal to 100.

In power transmission device 10, when transmission power is supplied from inverter 220 to power transmission unit 240, energy (electric power) is transferred from power transmission unit 240 to power reception unit 310 through an electromagnetic field formed between power transmission coil 242 (FIG. 2) of power transmission unit 240 and power reception coil 312 (FIG. 2) of power reception unit 310. The energy (electric power) transferred to power reception unit 310 is supplied to power storage device 350 through filter circuit 320 and rectification unit 330. Next, the details of a configuration (power transmission unit 240, power reception unit 310, filter circuits 230, 320, inverter 220) relevant to power transmission and reception in this contactless power transfer system 1 will be described.

<Details of Configuration Relevant to Power Transmission and Reception>

FIG. 2 shows the details of a configuration relevant to power transmission and reception according to the present embodiment. Referring to FIG. 2, inverter 220 includes a plurality of circuits each including a switching element implemented by an IGBT (Insulated Gate Bipolar Transistor) element, for example, and a diode connected in anti-parallel to the IGBT element. Filter circuit 230 includes a capacitor 246 and a coil 248. Filter circuit 230 is a secondary LC filter. Power transmission unit 240 includes power transmission coil 242 and a capacitor 244. Capacitor 244 is provided to compensate for the power factor of transmission power, and is connected in series with power transmission coil 242.

Power reception unit 310 includes a power reception coil 312 and a capacitor 314. Capacitor 314 is provided to compensate for the power factor of received power, and is connected in series with power reception coil 312. Filter circuit 320 includes a capacitor 322. Filter circuit 320 is a primary C filter.

A circuit configuration composed of power transmission unit 240 and power reception unit 310 is also called an SS (primary series-secondary series) arrangement. However, the circuit configuration composed of power transmission unit 240 and power reception unit 310 is not necessarily limited to such a configuration. For example, an SP (primary series-secondary parallel) arrangement with which capacitor 314 is connected in parallel with power reception coil 312 in power reception unit 310 may be adopted, or a PP (primary parallel-secondary parallel) arrangement with which capacitor 244 is further connected in parallel with power transmission coil 242 in power transmission unit 240 may be adopted.

When an abnormality originating from power transfer occurs during power transfer in such contactless power transfer system 1 that performs power transfer in a contactless manner between power transmission device 10 and power reception device 20, it is desirable that power transfer be stopped immediately from a viewpoint of system protection. An exemplary abnormality originating from power transfer is an overvoltage generated in power reception device 20.

In this embodiment, when the detection value of voltage sensor 380 exceeds a predetermined voltage during power transfer, drive circuit 375 causes crowbar circuit 325 to electrically conduct, thereby short-circuiting power reception coil 312. By short-circuiting power reception coil 312, the impedance on the power reception device 20 side as seen from the power transmission coil 242 side decreases. As a result, the current generated in power transmission device 10 increases. By detecting that the current generated in power transmission device 10 has increased beyond a predetermined value, power supply ECU 250 can detect indirectly that an overvoltage has occurred in power reception device 20.

In contactless power transfer system 1 that performs such contactless power transfer, however, the current generated in power transmission device 10 when power reception coil 312 is short-circuited may vary in magnitude depending on the coupling coefficient between power transmission coil 242 and power reception coil 312.

For example, FIG. 3 shows differences in detection value of current sensor 272 in accordance with the magnitude of the coupling coefficient between power transmission coil 242 and power reception coil 312. Referring to FIG. 3, the horizontal axis indicates the time, and the vertical axis indicates the detection value of current sensor 272. The upper graph shows transition of the detection value of current sensor 272 in the case where the coupling coefficient is K1, and the lower graph shows transition of the detection value of current sensor 272 in the case where the coupling coefficient is K2 (<K1).

Between time 0 to time tA0, power transfer is performed appropriately. Between time 0 to time tA0, the detection value of current sensor 272 is stable. When an overvoltage occurs at time tA0 and power reception coil 312 is short-circuited by crowbar circuit 325, the detection value of current sensor 272 rises.

In this example, when the coupling coefficient between power transmission coil 242 and power reception coil 312 is K1, the current value at the occurrence of an overcurrent is larger than when the coupling coefficient is K2. For example, suppose that only a threshold value Th1 is provided as the overcurrent threshold value, the occurrence of an overcurrent is detected when the coupling coefficient is K1, but is not detected when the coupling coefficient is K2.

Therefore, in contactless power transfer system 1 according to this embodiment, the configuration for estimating the coupling coefficient between power transmission coil 242 and power reception coil 312, and changing the overcurrent threshold value in accordance with the estimated coupling coefficient is adopted.

The threshold value is set by using a threshold value management table as shown in FIG. 4, for example, which manages the overcurrent threshold value for each coupling coefficient in the example shown in FIG. 3. Referring to FIG. 4, the left column indicates the coupling coefficient, and the right column indicates the overcurrent threshold value. In this example, threshold value Th1 is associated with coupling coefficient K1 as the overcurrent threshold value, and a threshold value Th2 is associated with coupling coefficient K2 as the overcurrent threshold value. Threshold value management table 400 is stored in an internal memory not shown of power supply ECU 250.

Power supply ECU 250 estimates the coupling coefficient, and then determines the overcurrent threshold value with reference to the threshold value management table. When the detection value of current sensor 272 exceeds the overcurrent threshold value, power supply ECU 250 controls inverter 220 to stop power transmission from power transmission unit 240.

Therefore, according to this contactless power transfer system 1, an increase in current in power transmission unit 240 following the short-circuiting of power reception coil 312 can be detected appropriately even if the coupling coefficient between power transmission coil 242 and power reception coil 312 varies, and power transmission can be stopped in an appropriate situation. As a result, this contactless power transfer system 1 is protected appropriately when an overvoltage occurs. Next, a system protecting operation when an overvoltage occurs in this contactless power transfer system 1 will be described in detail.

<System Protecting Operation when Overvoltage Occurs>

FIG. 5 is a flowchart showing an operation executed by drive circuit 375 when an overvoltage occurs. Referring to FIG. 5, drive circuit 375 detects the occurrence of an overvoltage in power reception device 20 during power transfer (step S100). Specifically, drive circuit 375 monitors the detection value of voltage sensor 380, and when the detection value exceeds a predetermined voltage, detects an overvoltage. Since it is necessary to execute processing for system protection when an overvoltage occurs, the occurrence of an overvoltage is detected in power reception device 20.

When the occurrence of an overvoltage is not detected in power reception device 20 (NO in step S100), the process proceeds to step S120. On the other hand, when the occurrence of an overvoltage is detected in power reception device 20 (YES in step S100), drive circuit 375 causes crowbar circuit 325 to electrically conduct, thereby short-circuiting power reception coil 312 (step S110). Accordingly, electric power supply from rectification unit 330 to power storage device 350 is interrupted.

FIG. 6 is a flowchart showing an operation of power transmission device 10 originating from the occurrence of an overvoltage in power reception device 20. Referring to FIG. 6, power supply ECU 250 determines whether or not a power transmission stop instruction has been issued during power transfer (step S200). When power storage device 350 is fully charged, or when a power transmission stop operation is performed by a driver, for example, the power transmission stop instruction is issued. If it is determined that the power transmission stop instruction has been issued (YES in step S200), the process proceeds to step S250.

On the other hand, if it is determined that the power transmission stop instruction has not been issued (NO in step S200), power supply ECU 250 estimates the coupling coefficient between power transmission coil 242 and power reception coil 312 (step S210). The coupling coefficient can be estimated from the current flowing in power transmission unit 240 and the voltage of received power in power reception device 20, for example. That is, it is known that coupling coefficient κ between power transmission coil 242 and power reception coil 312 is proportional to the ratio between a received power voltage V2 and a current I1 in power transmission unit 240. Coupling coefficient κ can be estimated by the following expression (1) when the load resistance of power reception device 20 is sufficiently large, for example.

$$\kappa = \{1/(\omega \cdot \sqrt{(L1 \cdot L2)})\} \cdot |V2|/|I1| \tag{1}$$

Here, ω indicates the transmission angular frequency, and L1 and L2 indicate the inductances of power transmission coil 242 and power reception coil 312, respectively. Received power voltage V2 can be detected by voltage sensor 380, and current I1 in power transmission unit 240 can be detected by current sensor 272. For example, information on inductance L2 of power reception coil 312 and received power voltage V2 is transmitted from charging ECU 360 to power supply ECU 250 through communication units 370, 260.

When the coupling coefficient is estimated, power supply ECU 250 determines the overcurrent threshold value from the estimated coupling coefficient and threshold value management table 400 (FIG. 4) (step S220). Specifically, power supply ECU 250 determines the threshold value associated with the estimated coupling coefficient in threshold value management table 400 as the overcurrent threshold value.

When the overcurrent threshold value is determined, power supply ECU 250 determines whether or not the detection value of current sensor 272 has exceeded the overcurrent threshold value (step S230). Such a determination is made because it can be indirectly detected that an overvoltage has occurred in power reception device 20 by detecting that an overcurrent has occurred in power transmission device 10. When it is determined that the detection value of current sensor 272 has not exceeded the overcurrent threshold value (NO in step S230), the process proceeds to step S200.

On the other hand, when it is determined that the detection value of current sensor 272 has exceeded the overcurrent threshold value (YES in step S230), power supply ECU 250 controls inverter 220 to stop power transmission from power transmission unit 240 (step S240). When power transmission is stopped, the process proceeds to step S250.

In this way, in contactless power transfer system 1 according to this embodiment, the coupling coefficient between power transmission coil 242 and power reception coil 312 is estimated, and the overcurrent threshold value is changed in accordance with the estimated coupling coefficient. Therefore, according to this contactless power transfer system 1, an increase in current in power transmission unit 240 following the short-circuiting of power reception coil 312 can be detected appropriately even if the coupling coefficient between power transmission coil 242 and power reception coil 312 varies, and power transmission can be stopped in an appropriate situation.

(Second Embodiment)

A second embodiment differs from the above-described first embodiment in specific configurations of filter circuit 230 of power transmission device 10 and filter circuit 320 of power reception device 20. Specifically, in the first embodiment, the secondary LC filter is used in power transmission device 10, and the primary C filter is used in power reception device 20. In this second embodiment, a quaternary LC filter is used in power transmission device 10, and a quaternary LC filter is also used in power reception device 20. Since the specific configuration of each filter circuit in this second embodiment differs from that of the first embodiment, the details of threshold value management table 400 are different from those of the first embodiment. Hereinafter, a difference from the first embodiment will be described in detail.

<Details of Configuration Relevant to Power Transmission and Reception>

Figure 7:
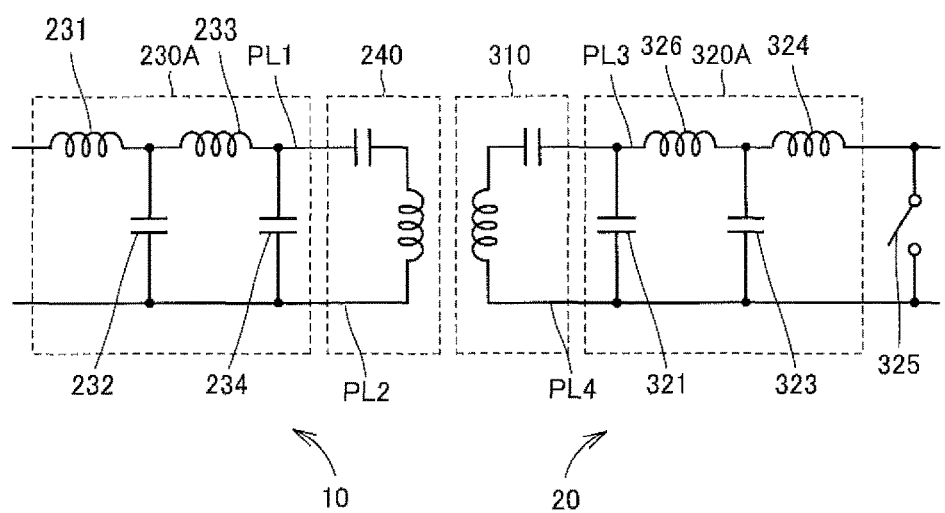
FIG. 7 shows the details of a configuration relevant to power transmission and reception according to a second embodiment.

FIG. 7 shows the details of a difference from the first embodiment in the configuration relevant to power transmission and reception in this second embodiment. Referring to FIG. 7, power transmission device 10 includes a filter circuit 230A and power transmission unit 240. Power reception device 20 includes power reception unit 310 and a filter circuit 320A.

Filter circuit 230A is a quaternary LC filter including two coils and two capacitors. Specifically, filter circuit 230A includes coils 231, 233 provided on a positive electrode line PL1 as well as capacitors 232, 234 connected between positive electrode line PL1 and a negative electrode line PL2. Filter circuit 320A is a quaternary LC filter including two coils and two capacitors, similarly to filter circuit 230A. Specifically, filter circuit 320A includes coils 326, 324 provided on a positive electrode line PL3 as well as capacitors 321, 323 connected between positive electrode line PL3 and a negative electrode line PL4.

Since the specific configuration of each filter circuit differs in this way from that of the first embodiment, the relation between the coupling coefficient between power transmission coil 242 and power reception coil 312 and the magnitude of the current generated in power transmission device 10 when power reception coil 312 is short-circuited also differs from that of the first embodiment.

Figure 8:
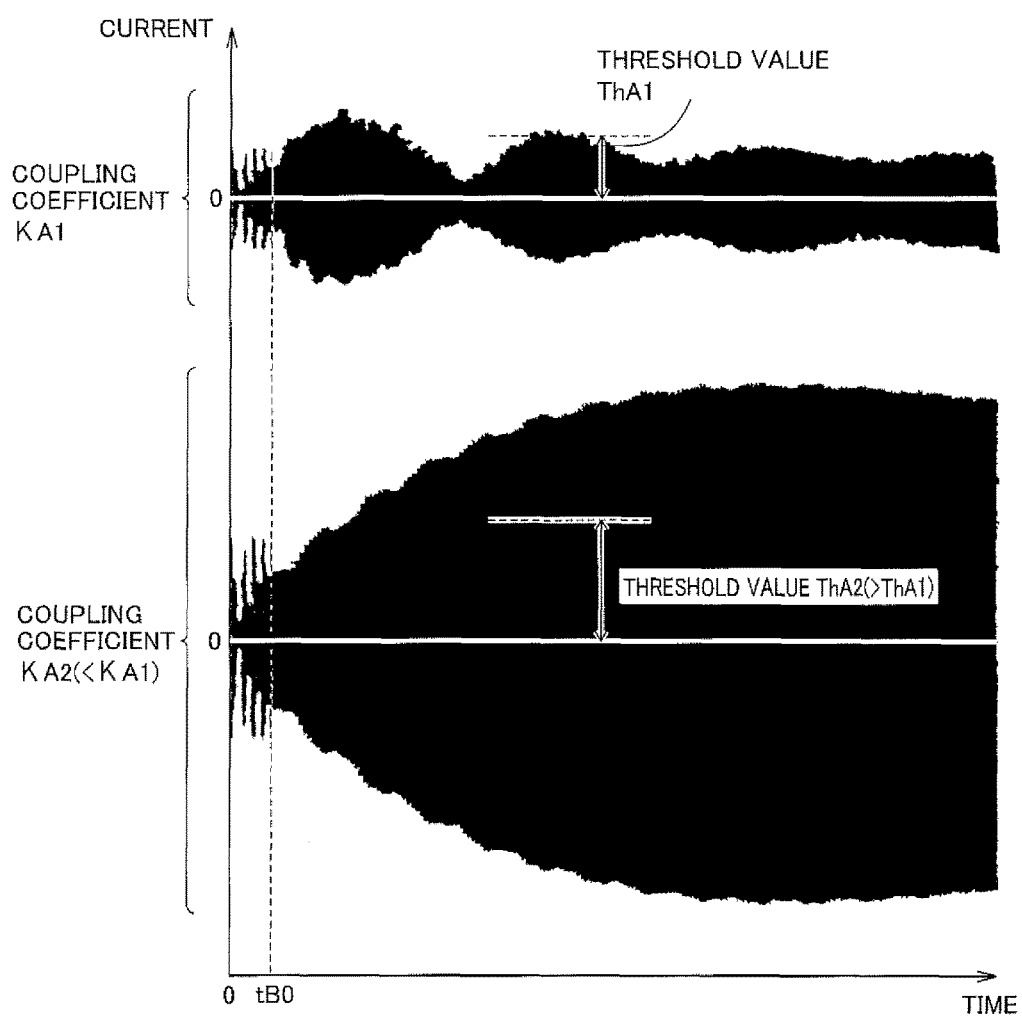
FIG. 8 shows differences in detection value of a current sensor in accordance with the magnitude of a coupling coefficient between a power transmission coil and a power reception coil.

FIG. 8 shows differences in detection value of current sensor 272 in accordance with the magnitude of the coupling coefficient between power transmission coil 242 and power reception coil 312 in this second embodiment. Referring to FIG. 8, the upper graph indicates transition of the detection value of current sensor 272 in the case where the coupling coefficient is KA1, and the lower graph indicates transition of the detection value of current sensor 272 in the case where the coupling coefficient is KA2 (<KA1). In this example, power reception coil 312 is short-circuited at time tB0.

Power reception coil 312 is short-circuited at time tB0, and the subsequent detection value of current sensor 272 is larger when the coupling coefficient is KA2 (<KA1) than when the coupling coefficient is KA1. Therefore, a larger threshold value needs to be set as the overcurrent threshold value when the coupling coefficient is KA2 than when the coupling coefficient is KA1.

Such a relation in which, the larger the coupling coefficient, a smaller threshold value needs to be set as the overcurrent threshold value is contrary to the first embodiment (in which the larger the coupling coefficient, a larger threshold value is set as the overcurrent threshold value).

Therefore, in this second embodiment, a threshold value management table 400A as shown in FIG. 9, for example, is used for determining the overcurrent threshold value. FIG. 9 shows an example of a threshold value management table in the example shown in FIG. 8 which manages the overcurrent threshold value for each coupling coefficient. Referring to FIG. 9, the left column indicates the coupling coefficient, and the right column indicates the overcurrent threshold value. In this example, a threshold value ThA1 is associated with coupling coefficient KA1 as the overcurrent threshold value, and a threshold value ThA2 (>ThA1) is associated with coupling coefficient KA2 (<KA1) as the overcurrent threshold value. That is, in this second embodiment, a larger threshold value is set as the overcurrent threshold value when the coupling coefficient is small than when the coupling coefficient is large.

By determining the overcurrent threshold value using this threshold value management table 400A in this second embodiment, an increase in current in power transmission unit 240 following the short-circuiting of power reception coil 312 can be detected appropriately even if the coupling coefficient between power transmission coil 242 and power reception coil 312 varies, and power transmission can be stopped in an appropriate situation.

As understood from the first and second embodiments, the relation between the coupling coefficient between power transmission coil 242 and power reception coil 312 and the magnitude of the current generated in power transmission device 10 when power reception coil 312 is short-circuited differs among properties of filter circuits. Therefore, in the first and second embodiments, the overcurrent threshold value associated with each coupling coefficient is set previously in accordance with the property of each filter circuit. Therefore, according to this contactless power transfer system 1, an increase in current in power transmission unit 240 following the short-circuiting of power reception coil 312 can be detected appropriately in accordance with the properties of the filter circuits connected to power transmission unit 240 and power reception unit 310, and power transmission can be stopped in an appropriate situation.

(Third Embodiment)

In the first and second embodiments, examples in which the filter property of each filter circuit is fixed are described. In a contactless power transfer system, however, a power reception device to be charged may vary in filter property. In this third embodiment, a configuration that can be applied even when the power reception device varies in filter property will be described.

In this third embodiment, power transmission device 10 has a plurality of threshold value management tables associated with combination patterns of configurations of filter circuits 230, 320. Moreover, power transmission device 10 receives information on the configuration of filter circuit 320 of power reception device 20. Power supply ECU 250 selects any threshold value management table from among the plurality of threshold value management tables based on the received information on the configuration of filter circuit 320 and information on the configuration of filter circuit 230. Power supply ECU 250 determines the overcurrent threshold value using the selected threshold value management table. Hereinafter, differences from the first and second embodiments will be described in detail.

<System Protecting Operation when Overvoltage Occurs>

FIG. 10 is a flowchart showing an operation of power transmission device 10 originating from the occurrence of an overvoltage in power reception device 20 according to this third embodiment. Referring to FIG. 10, steps S200 to S210 and S230 to S250 are identical to those shown in FIG. 6, and will not be described here.

Before the start of power transmission from power transmission unit 240, power supply ECU 250 receives information on the configuration of filter circuit 320 from charging ECU 360 through communication units 260, 370 (step S300). For example, power supply ECU 250 receives information indicating that filter circuit 320 is a C filter (corresponding to the first embodiment) or information indicating that filter circuit 320 is a quaternary LC filter (corresponding to the second embodiment).

Upon receipt of the information on the configuration of filter circuit 320, power supply ECU 250 selects a threshold value management table from among the plurality of threshold value management tables in accordance with the combination of filter configurations of power transmission device 10 and power reception device 20 (step S310). For example, power supply ECU 250 has stored in an internal memory not shown a plurality of threshold value management tables including threshold value management table 400 (first embodiment) and threshold value management table 400A (second embodiment). When the information that filter circuit 320 is a C filter is received in step S310, power supply ECU 250 selects threshold value management table 400 as the threshold value management table. On the other hand, when the information that filter circuit 320 is a quaternary LC filter is received in step S310, power supply ECU 250 selects threshold value management table 400A as the threshold value management table.

When the threshold value management table is selected, preparation necessary for starting power transmission is conducted, and power transmission from power transmission unit 240 is started (step S320). When the coupling coefficient is estimated in step S210, power supply ECU 250 determines the overcurrent threshold value using the threshold value management table selected in step S310 and the estimated coupling coefficient (step S220A).

In this way, in this third embodiment, the information on the configuration of filter circuit 320 is transmitted from power reception device 20 to power transmission device 10, and a threshold value management table suited to the configurations of filter circuits 230, 320 is selected in power transmission device 10. Therefore, according to this third embodiment, even if the configuration of filter circuit 320 in the power reception device differs among power reception devices, a threshold value management table suited to that filter circuit can be selected. Thus, in power transmission device 10, an increase in current in power transmission unit 240 following the short-circuiting of power reception coil 312 can be detected appropriately, and power transmission can be stopped in an appropriate situation.

(Other Embodiments)

The first to third embodiments are described above as embodiments of the present invention. However, the present invention is not necessarily limited to these embodiments. Examples of other embodiments will be described now.

In the first to third embodiments, the overcurrent threshold value shall be determined based on the coupling coefficient. However, the method of determining the overcurrent threshold value is not necessarily limited as such. For example, the overcurrent threshold value may be determined by estimating the coupling state between power transmission coil 242 and power reception coil 312 in step S210 only from the ratio between received power voltage V2 in power reception device 20 and current I1 in power transmission unit 240, rather than calculating coupling coefficient κ. In this case, in the configuration of the first embodiment, since the coupling state is stronger as the magnitude of received power voltage V2 is larger relative to current I1, a large threshold value is set as the overcurrent threshold value. In the configuration of the second embodiment, a smaller threshold value is set as the overcurrent threshold value as the magnitude of received power voltage V2 is larger relative to current I1. In short, the coupling coefficient does not necessarily need to be estimated for determining the overcurrent threshold value, but the coupling state between power transmission coil 242 and power reception coil 312 should just be estimated.

Another configuration may be adopted in which the overcurrent threshold value is determined by detecting the magnitude of reflected power during power transmission. In this case, in the configuration of the first embodiment, since the coupling state is stronger as the magnitude of reflected power is smaller, a large threshold value is set as the overcurrent threshold value. In the configuration of the second embodiment, a smaller threshold value is set as the magnitude of reflected power is larger.

Another configuration may be adopted in which the overcurrent threshold value is determined by detecting a transmission efficiency during power transmission. In this case, in the configuration of the first embodiment, since the coupling state is stronger as the transmission efficiency is higher, a large threshold value is set as the overcurrent threshold value. In the configuration of the second embodiment, a smaller threshold value is set as the transmission efficiency is higher.

In the first to third embodiments, each time when it is determined in step S230 of FIG. 6 that current I1 has not exceeded the overcurrent threshold value, the coupling coefficient shall be estimated in step S210 in each cycle. However, the timing for estimating the coupling coefficient is not necessarily limited as such. For example, the coupling coefficient may be estimated only in an initial cycle, or may be estimated once in several cycles.

In the above description, power transmission device 10 corresponds to one embodiment of a "power transmission device" according to the present invention, and power reception device 20 corresponds to one embodiment of a "power reception device" according to the present invention. The configuration composed of inverter 220 and power transmission unit 240 corresponds to one embodiment of a "power transmission unit" according to the present invention. Power reception unit 310 corresponds to one embodiment of a "power reception unit" according to the present invention. Power supply ECU 250 corresponds to one embodiment of a "control unit" according to the present invention. The configuration composed of crowbar circuit 325 and drive circuit 375 corresponds to one embodiment of a "protection circuit" according to the present invention. Filter circuits 230, 320 correspond to one embodiment of "filters" according to the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A contactless power transfer system for transferring electric power in a contactless manner between a power transmission device and a power reception device, the contactless power transfer system comprising:
   a power transmission unit including a power transmission coil and configured to transmit electric power in a contactless manner;
   a power reception unit including a power reception coil and configured to receive electric power from the power transmission unit in a contactless manner;
   a protection circuit configured to short-circuit the power reception coil when an overvoltage occurs in the power reception device originating from power reception by the power reception unit, the power transmission unit being configured to generate a current in the power transmission unit when the power reception coil is short-circuited by the protection circuit; and
   a control unit configured to control the power transmission unit to stop power transmission when the current generated in the power transmission unit exceeds a predetermined threshold value due to short-circuiting of the power reception coil,
   the control unit being configured to estimate a coupling state between the power transmission coil and the power reception coil, and change the predetermined threshold value in accordance with the estimated coupling state.

2. The contactless power transfer system according to claim 1, further comprising first and second filters connected to the power transmission unit and the power reception unit, respectively, wherein
the predetermined threshold value is set previously in accordance with properties of the first and second filters.

3. A power transmission device for transmitting electric power to a power reception device in a contactless manner, the power reception device including:
a power reception unit including a power reception coil and configured to receive electric power in a contactless manner; and
a protection circuit configured to short-circuit the power reception coil when an overvoltage occurs in the power reception device originating from power reception by the power reception unit,
the power transmission device including:
a power transmission unit including a power transmission coil and configured to transmit electric power to the power reception unit in a contactless manner; and
a control unit,
the power transmission unit being configured to generate a current in the power transmission unit when the power reception coil is short-circuited by the protection circuit,
the control unit being configured to control the power transmission unit to stop power transmission when the current generated in the power transmission unit exceeds a predetermined threshold value due to short-circuiting of the power reception coil,
the control unit being configured to estimate a coupling state between the power transmission coil and the power reception coil, and change the predetermined threshold value in accordance with the estimated coupling state.

4. The contactless power transfer system according to claim 1, further comprising first and second filters connected to the power transmission unit and the power reception unit, respectively, wherein
the control unit includes a memory storing a plurality of threshold value management tables associated with combination patterns of configurations of the first and second filters, and
the control unit is configured to select any one threshold value management table from among the plurality of threshold value management tables in accordance with a combination of configurations of the first and second filters to determine the predetermined threshold value using the selected threshold value management table and the estimated coupling state.

5. The power transmission device according to claim 3, wherein
the power transmission device includes a first filter connected to the power transmission unit,
the power reception device includes a second filter connected to the power reception unit,
the control unit includes a memory storing a plurality of threshold value management tables associated with combination patterns of configurations of the first and second filters, and
the control unit is configured to select any one threshold value management table from among the plurality of threshold value management tables in accordance with a combination of configurations of the first and second filters to determine the predetermined threshold value using the selected threshold value management table and the estimated coupling state.

* * * * *